(12) United States Patent  (10) Patent No.: US 9,041,654 B2
Ellard  (45) Date of Patent: May 26, 2015

(54) VIRTUAL TOUCHSCREEN KEYBOARDS

(71) Applicant: Michael Patrick Ellard, San Jose, CA (US)

(72) Inventor: Michael Patrick Ellard, San Jose, CA (US)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 13/716,422

(22) Filed: Dec. 17, 2012

(65) Prior Publication Data

US 2014/0168083 A1  Jun. 19, 2014

Related U.S. Application Data

(60) Provisional application No. 61/673,089, filed on Jul. 18, 2012.

(51) Int. Cl.
*G06F 3/0488* (2013.01)
*G06F 3/023* (2006.01)
*G06F 3/041* (2006.01)
*G06F 3/02* (2006.01)

(52) U.S. Cl.
CPC ........ *G06F 3/04886* (2013.01); *G06F 3/04883* (2013.01); *G06F 3/0238* (2013.01); *G06F 3/041* (2013.01); *G06F 3/0236* (2013.01); *G06F 3/0216* (2013.01)

(58) Field of Classification Search
USPC .................................................. 345/173, 168
See application file for complete search history.

(56) References Cited

U.S. PATENT DOCUMENTS

| | | | |
|---|---|---|---|
| 2006/0085757 A1* | 4/2006 | Andre et al. .................. | 715/771 |
| 2010/0259561 A1* | 10/2010 | Forutanpour et al. ......... | 345/660 |
| 2012/0154313 A1* | 6/2012 | Au et al. ........................ | 345/173 |
| 2012/0162078 A1* | 6/2012 | Ferren et al. .................. | 345/168 |
| 2013/0207920 A1* | 8/2013 | McCann et al. ............... | 345/173 |

OTHER PUBLICATIONS

Han, Jeff, "Jaff Han demos his breakthrough touchscreen", TED Talks, [Online], Retrieved from the Internet: <URL:http://www.ted.com/talks/jeff_han_demos_his_breakthrough_touchscreen.html>, (Aug. 2006), video.

* cited by examiner

*Primary Examiner* — Claire X Pappas
*Assistant Examiner* — Scott Trandai
(74) *Attorney, Agent, or Firm* — Schwegman Lundberg & Woessner, P.A.

(57) ABSTRACT

A dynamically updated virtual keyboard may be presented on a touchscreen of a user device by detecting a first hand position on the touchscreen. A virtual keyboard may then be displayed on the touchscreen, the virtual keyboard based on the first hand position. Characteristics of the virtual keyboard, such as size, position, orientation, and selection of the keys can also vary based on the first hand position and on other input features.

19 Claims, 12 Drawing Sheets

VIRTUAL TOUCHSCREEN KEYBOARDS

CROSS-REFERENCE TO RELATED APPLICATIONS

This application claims the benefit of U.S. Provisional Application No. 61/673,089, filed Jul. 18, 2012, entitled "VIRTUAL TOUCHSCREEN KEYBOARDS," which is incorporated herein by reference in its entirety.

TECHNICAL FIELD

This document generally relates to systems and methods for virtual touchscreen keyboards.

BACKGROUND

Many modern devices contain touchscreens. Smartphones, for example, have evolved from cellular phones having physical buttons to devices made up almost entirely using a touchscreen as the sole input device (beyond the occasional power and volume buttons). Table computers have also grown in popularity, and have their own (albeit larger) touchscreen displays.

In order to permit users to type letters and numbers on a touchscreen display, virtual keyboards and keypads are provided. These virtual keyboards and keypads present buttons on the screen that resemble a traditional keyboard or keypad. These keyboards and keypads appear in fixed places on the device's screen and are uniformly displayed. In other words, while the size, orientation, and layout of the virtual keyboard can vary from device to device, the keyboard or keypad that is displayed on a single device is typically the same, without regard for the user.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Various embodiments as illustrated and described herein provide mechanisms that permit virtual keyboards or keypads that configure themselves based on the user's finger placement on the screen. The keyboard or keypad can appear anywhere on the screen, depending upon where the user places his or her hands. The keyboard or keypad can also then be sized and positioned according to the placement of the user's fingers.

Figure 1:
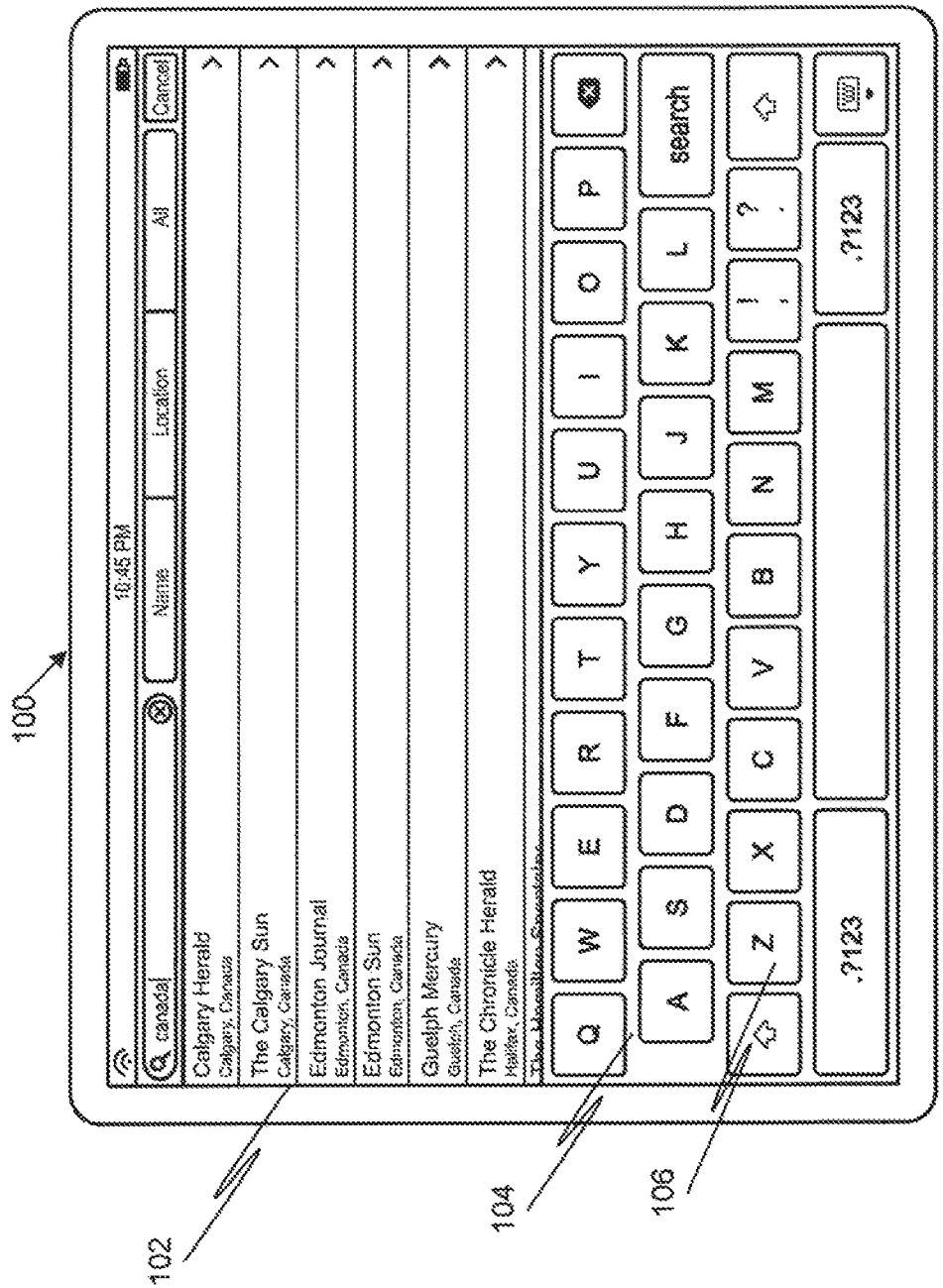
FIG. 1 is an apparatus diagram illustrating, in accordance with an example embodiment, an exterior view of a mobile device.

FIG. 1 is an apparatus diagram illustrating, in accordance with an example embodiment, an exterior view of a mobile device. Here the mobile device 100 is a tablet computer. The mobile device 100 contains a touchscreen 102. Displayed on the touchscreen 102 is a virtual keyboard 104. The virtual keyboard 104 simulates a physical keyboard, in that a user can depress one or more of the keys 106, and input is generated to the mobile device 100 corresponding to the characters of the depressed keys. Typically this input is generated in terms of an ASCII code corresponding to the appropriate character, although embodiments are envisioned where other coding mechanisms are used to differentiate characters. While the virtual keyboard 104 appears like a traditional keyboard (i.e., with traditional keyboard layout), as will be seen, the virtual keyboard 104 can be dynamically modified so that the position and configuration of the keys 106 changes.

It should be noted that while the above example embodiment describes a mobile device, the present disclosure is applicable to any electronic device having a virtual keyboard. As such, other types of electronic devices such as laptop computers and desktop computers with touchscreens can also utilize the technology.

Figure 2:
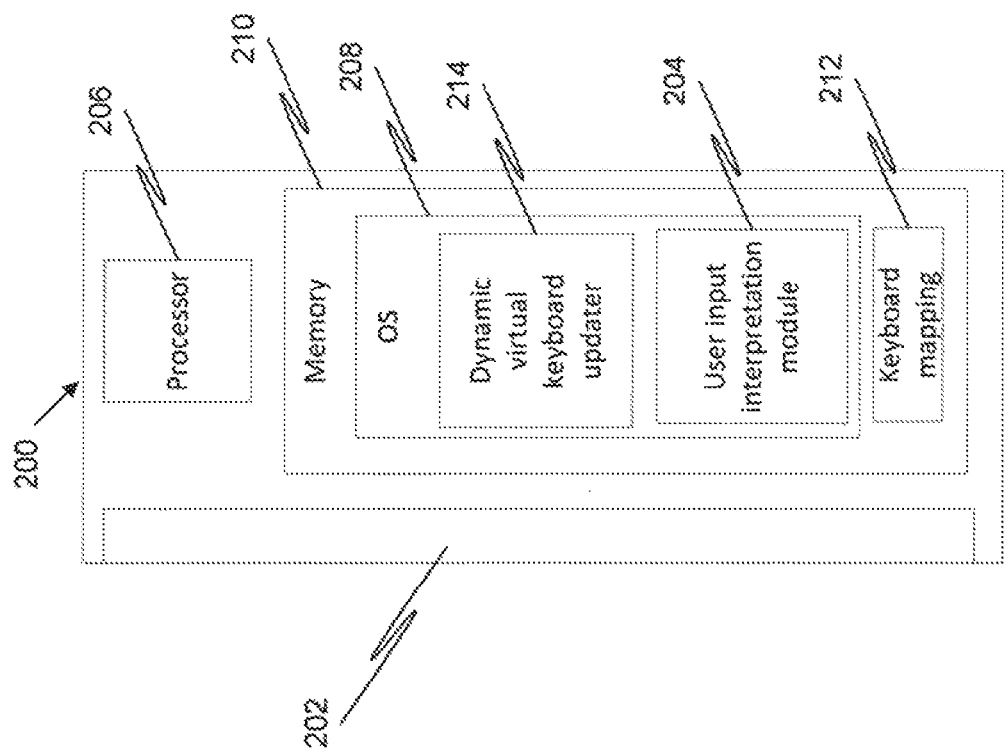
FIG. 2 is a block diagram illustrating, in accordance with an example embodiment, components of a mobile device.

FIG. 2 is a block diagram illustrating, in accordance with an example embodiment, components of a mobile device. Here, the mobile device 200 includes a touchscreen 202 which is coupled to a user input interpretation module 204. The user input interpretation module 204 receives input from the touchscreen 202 and determines, in connection with a processor 206, what instructions to issue based on the user input. For example, if the user input received is a movement from a bottom of the touchscreen 202 to a top of the touchscreen 202, the user input interpretation module 204 may determine that a "navigate up" instruction should be generated. The user input interpretation module 204 may be a part of an operating system 208 loaded in memory 210 of the mobile device 200. If a virtual keyboard is currently displayed on the touchscreen 202, then the user input interpretation module 204 may be configured to convert as "press" input from the touchscreen 202 into a generated character based on a keyboard mapping 212 stored in memory 210. This keyboard mapping 212 may contain, for example, a listing of characters in the virtual keyboard and a range of locations on the touchscreen 202 that correspond to each virtual key. Thus, for example, the keyboard mapping 212 may contain an entry specifying that the "a" character is generated when a press is detected in a region of the touchscreen 202 bounded by specified coordinates.

In an example embodiment, as will be described in more detail later, the keyboard mapping 212 (and the corresponding virtual keyboard displayed on the touchscreen 202) may be dynamically altered based on previous user input. This alteration may be determined and executed by a dynamic virtual keyboard updater 214 located on the mobile device 200.

Figure 3:
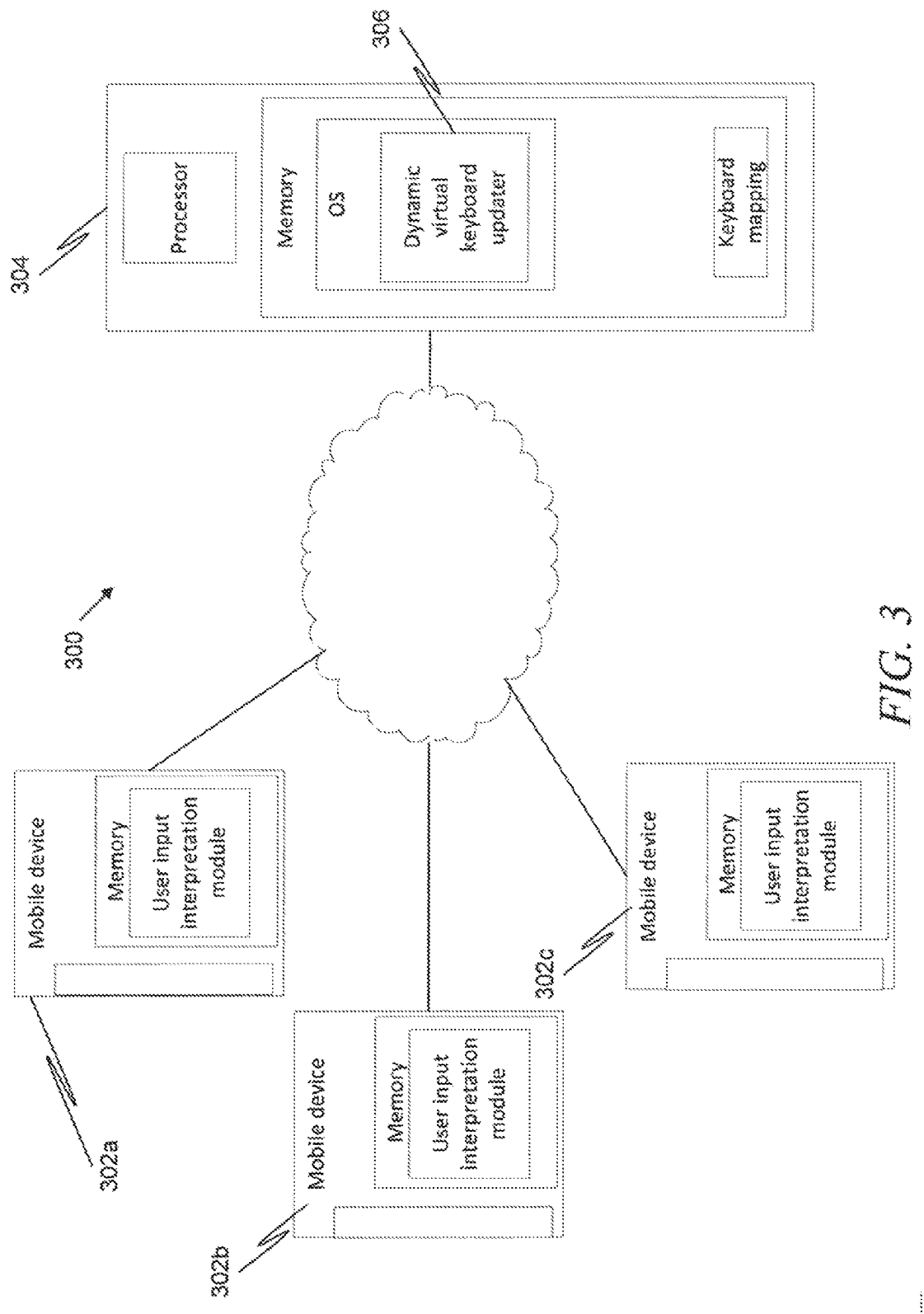
FIG. 3 is a system diagram illustrating a system, in accordance with an example embodiment, for dynamically updating a virtual keyboard.

FIG. 3 is a system diagram illustrating a system, in accordance with an example embodiment, of dynamically updating a virtual keyboard. Here, the system 300 depicts an embodiment where, rather than performing the determination of how to dynamically alter the virtual keyboard at the mobile device 302a itself, the determination is offloaded to a separate device 304, such as a computer for which the mobile device 302a is acting as an input device. This separate device 304 may even, for example, perform the determination for a number of different mobile devices 302a, 302b, 302c, thus reducing the load on the mobile devices 302a, 302b, 302c. As such, a dynamic virtual keyboard updater 306 may be located on the separate device 304.

It should be noted that there are additional possible embodiments that combine elements of the server embodiment of FIG. 3 and the mobile device embodiment of FIG. 2. For example, a component on the separate device 304 of FIG. 3 could make decisions as to how to update the keyboard for a particular user based on not only that user's prior input but also input from other users (perhaps weighted in favor of the user's prior input). The actual updating of the virtual keyboard, however, could be performed by the mobile devices themselves. All of these possible permutations are conceived by this disclosure.

In another example embodiment, the separate device 304 is a server device. This would allow the keyboard settings of a user to be stored remotely and utilized by different mobile devices 302a, 302b, 302c, which may be operated by the same user. This would also allow the user to easily upgrade a mobile device to a different mobile device as the user's settings could simply be retrieved from the server device. Similarly, it could be used in replacing a broken or lost device.

Turning now to the operation of the dynamic updating of keyboards, in one example embodiment the system detects the placement of the user's hands. This example embodiment is geared for devices that have a large enough touchscreen to accommodate both hands of the user. As such, most smartphones would not qualify but many tablet computers would. Of course, the dividing line between smartphone and tablet has been disappearing and there is nothing preventing this embodiment from being applied to smartphone if the circumstances allow it.

Figure 4:
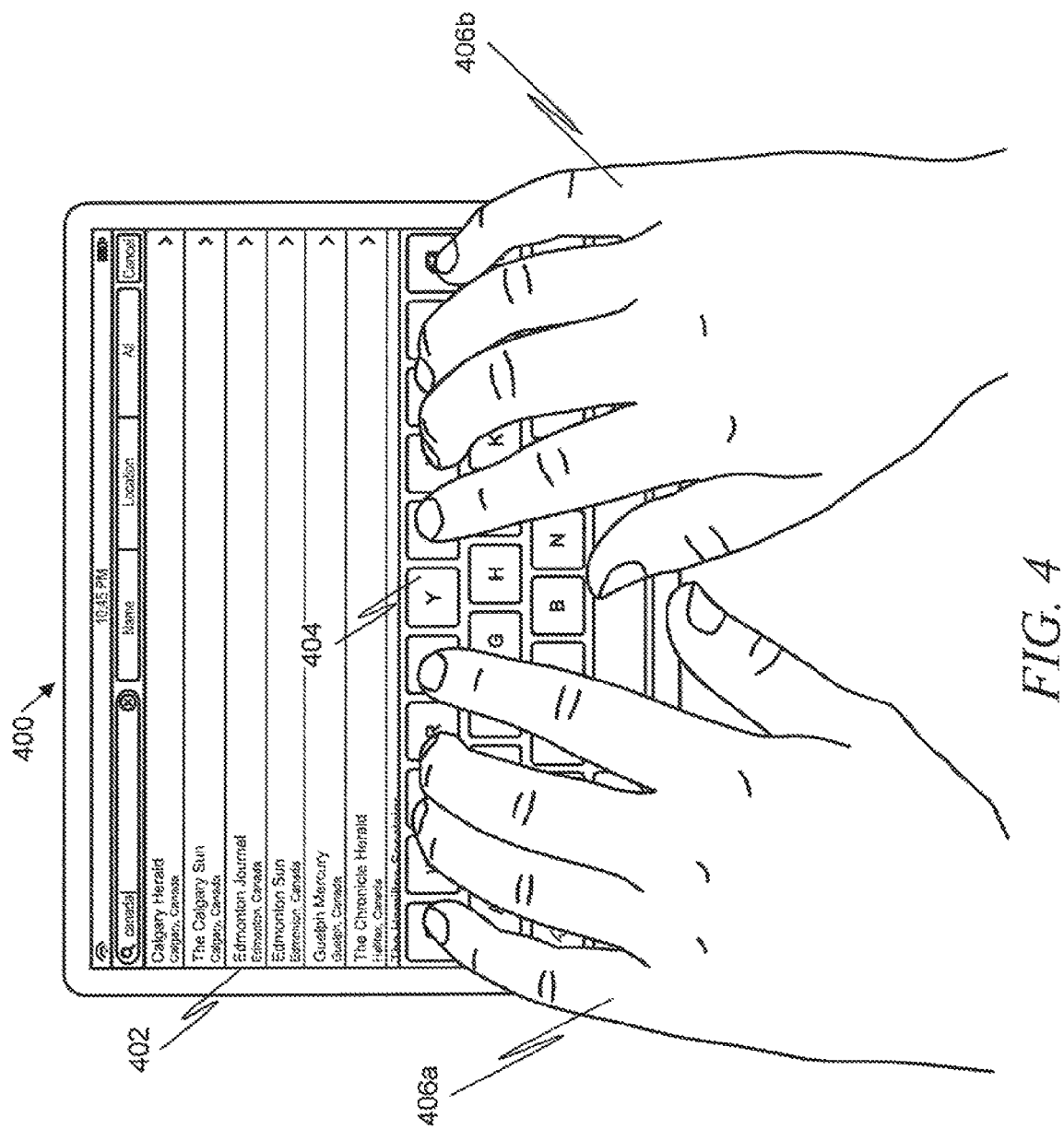
FIG. 4 is a diagram illustrating a mobile device, in accordance with an example embodiment, displaying a default virtual keyboard.

FIG. 4 is a diagram illustrating a mobile device, in accordance with an example embodiment, displaying a default virtual keyboard. On the mobile device 400, a touchscreen 402 may display a default virtual keyboard 404. This default virtual keyboard 404 may be a keyboard saved for the operating system as a whole (i.e., as default virtual keyboard across all devices using the operating system), or may be a customized default virtual keyboard for this particular mobile device 400 or user. In one example embodiment, the default virtual keyboard 404 is simply the last virtual keyboard that was used on the device 400.

As can be seen from FIG. 4, a user has placed his hands 406a, 406b in a comfortable position over the touchscreen 402 of the mobile device 400. As also can be see, this particular positioning of the hands 406a, 406b does not provide the user with easy access to the virtual keyboard 404. Specifically, only the thumb and index finger of each hand 406a, 406b is positioned over the keyboard 404, requiring the user to rotate and bend each hand 406a, 406b to type with all five fingers.

In the example embodiment, at this point the system may detect the user's hand positions. This process will be described in more detail later. Once the hand location is detected, a "home row" for the virtual keyboard can be assigned. This home row corresponds to the middle row of a conventional keyboard (most commonly, in a QWERTY keyboard, the row beginning with "ASDFG," although nothing in this application shall be read as limiting the embodiments to only QWERTY keyboards or this particular home row). This allows the user the most flexibility and ease of use as all the keys are located within a row or two of a user's fingers. At that point, a new layout for the keyboard may be placed on the touchscreen.

Figure 5:
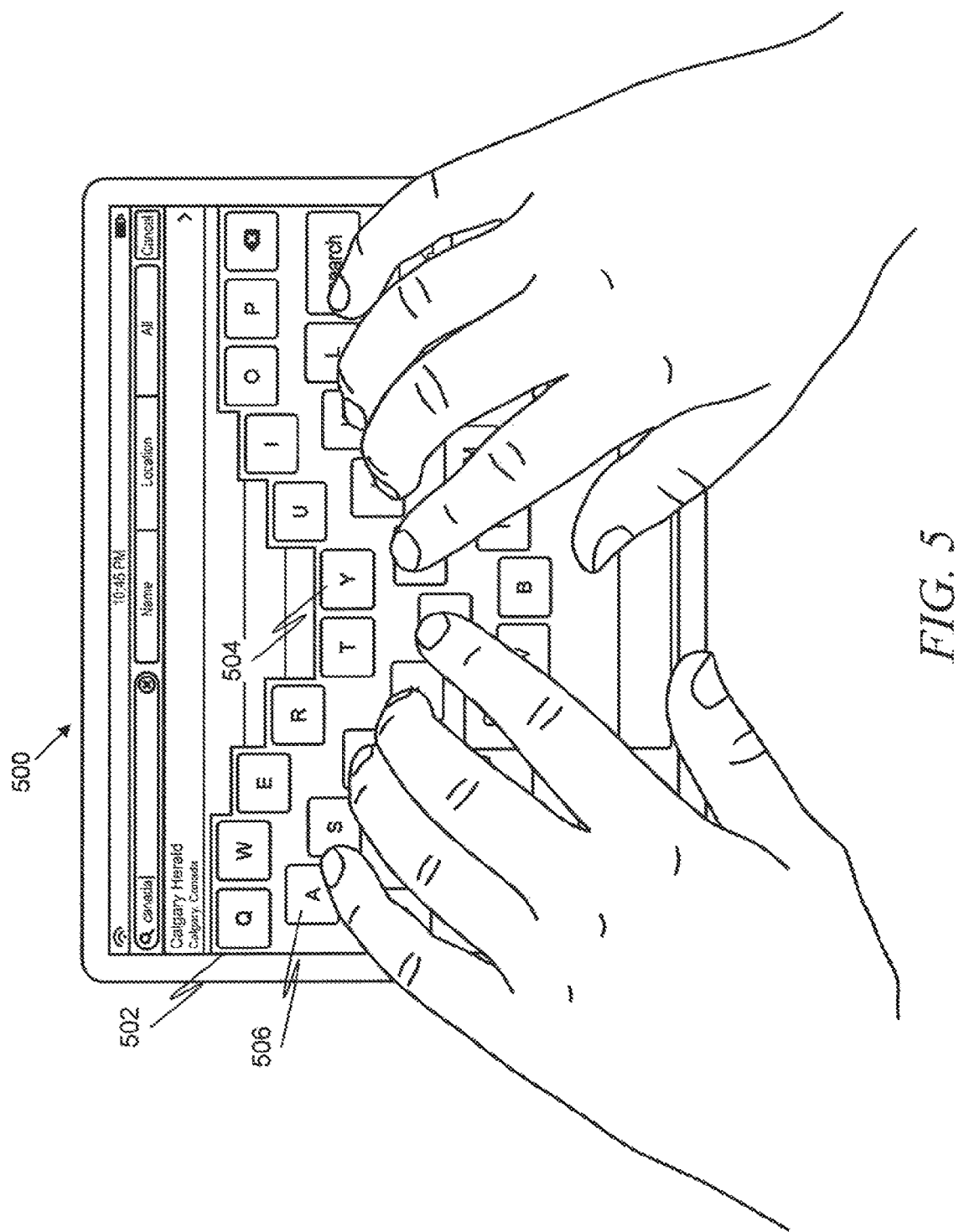
FIG. 5 is a diagram illustrating a mobile device, in accordance with an example embodiment, displaying a dynamically updated keyboard layout.

FIG. 5 is a diagram illustrating a mobile device, in accordance with an example embodiment, displaying a dynamically updated keyboard layout. On the mobile device 500, the touchscreen 502 may now display the dynamically updated keyboard layout 504. As can be seen, the keys in the home row 506 are distributed along the user's fingers (with the exception of the thumb, which is typically located at or around a space bar). This results in a virtual keyboard layout that is substantially non-rectangular, significantly different from prior art virtual keyboard layouts.

Hand detection may be performed in a number of different ways. In one embodiment, the user's hands are identified by locating a number of fingers being applied to the touchscreen in various areas of the touchscreen. For a full keyboard, it will be helpful for the users to place all five fingers from both hands on the display. Embodiments are possible where even fewer fingers are detected. In an extreme case, it is even possible to present a virtual keyboard based on the detection of only a single finger from a single hand. However, the accuracy of the virtual keyboard in accommodating itself to the user's particular hand size, shape, orientation, and placement will be improved the more fingers are detected.

In another example embodiment, it is possible to detect the palm of a hand and use that information to extrapolate finger location. The extrapolation is more accurate if the user has used the system before and the system has knowledge of previous instances where, for example, the user placed both his palms and his fingers on the touchscreen, allowing the system to measure the distances between them and use that information for future sessions.

In another example embodiment, a learning algorithm is used in order to improve the accuracy and effectiveness of the virtual keyboard or keypad over time. User preferences, for example, can be recorded and saved. Entire keyboard layouts and configurations can also be recorded and saved. Additionally, typographical errors can be detected (such as through examining when a backspace key is used to erase recently typed letters and then those letters are replaced with keystrokes that are in slightly different locations than the recently typed letters). The system can therefore adapt the virtual keyboard over time with user input to reduce the typographical errors for this particular user.

In an example embodiment, finger identification is performed using ten touches, representing all ten of a user's fingers. Here, first the greatest distance between two touches is found. These touches will be pinkies. Next, the closest unused finger to each pinkie is found. This will be the ring finger for that pinkie's hand.

Next, the next closest unused finger to each ring finger is found. This will be the middle finger for that ring finger's hand. Next, the next closest unused finger to each middle finger is found. This will be the index finger for that middle finger's hand. Next, the next closest unused finger to each pinkie. That will be the thumb for that pinkie's hands.

After having assigned the fingers to the hands, now it is time to tell the left hand from the right hand. Using the line that runs between the two pinkies, the system can tell the left and right pinkies from each other by looking at the which side of the pinkie line the thumbs are on. Specifically, the system may derive the equation for the line between the two pinkies in y=mx+b form. Using the x coordinate lilt one of the thumbs, the system may calculate the corresponding y value on the pinkie line. If the thumb's y value is greater than the y value on the pinkie line for that touch's x value, then the pinkie with the lowest x value is the left hand. If the thumb's y value is less than the y value on the pinkie line for the furthest touch's x value, then the pinkie with the highest x value is the left hand.

It is possible that if the hands are slightly offset vertically, then when assigning the thumbs, the closest unused finger to a pinkie could be the thumb from the opposite hand. Here is how to prevent problems of this sort. If there are two unassigned fingers—fingers A & B—then the distances between the pinkie and the thumb may be calculated for both hands if 1) A were assigned to the left hand and B to the right or 2) if A were assigned to the right hand and B to the left. For options 1 and 2, the distance from the pinkie to the thumb is subtracted for the left hand from the distance from the pinkie to the thumb for the right hand. The option that returns the result closest to zero is the correct one (i.e., the distances between the pinkie and the thumb for each hand should be roughly equal).

If the hands are far apart, this algorithm will work cleanly. If the hands are close to one another and in ergonomic alignment with one another, this algorithm will work cleanly.

If the hands are close to one another but not in ergonomic alignment (i.e., in terms of the user's body, either A) one hand is further forward than the other or B) one hand is above the other), this algorithm may not be able to correctly identify the fingers of each hand. Using the touch screens that are currently commercially available, this is not an issue, since there is not enough room for a user to position their hands in an incorrect way. It is also not an issue because the keyboard is supposed to be an ergonomic keyboard, and it is not very comfortable for users to hold their hands in such a way that this algorithm will not work. With this said, in anticipation of larger touch screens, a check should be done to verify that the calculations above return numbers that make sense. If the sum of the right hand linger distances is significantly different from the sum of the left hand distances, then the user should be asked to reposition his or her hands. For the purpose of one keyboard, this is an appropriate solution, since the keyboard will not be able to be created if the user has positioned their hands in this way, even with an accurate determination of the users' finger positions.

Alternately, if the user twists their hands inwards more than 90° from a "straight forward" position, then the thumbs may be incorrectly identified as the pinkies. In terms of determining hand position, this can be corrected by ensuring that the distance between the thumb and the forefinger is greater than the distance between the pinkie and the ring finger, and reversing the order of the fingers if it is not. However, even using this method, it will not be possible to create an appropriate keyboard if the user has positioned their hands in this way; in this case, the user should simply be asked to reposition their hands.

It is possible that the user will touch the screen with something other than their fingers, such as the palm or heal of the hand. In this case, the collection of touches should be ignored when determining finger position. Here are some metrics that one can use to identify when the system is getting something other than valid finger touches after the assignment of touches has been completed according to the method above:

1) If the distance from one hand's ring finger to that hand's middle finger is greater than 1.5 times that hand's distance from the pinkie to ring finger;

2) If the distance from one hand's middle to index finger is greater than 1.5 times that hand's distance from the pinkie to ring finger; and 3) If the distance from one hand's index finger to thumb is less than that hand's distance from the pinkie to ring finger.

If any of these tests is true for either hand, then the touches should be discarded and the user should try again.

In another embodiment, the "pinkie line", meaning the line that runs between the user's two pinkies, can also be used to determine the user's position relative to the touchscreen. This is important for placement of the top and bottom row keys when forming the virtual keyboard. The keys can be placed relative to the user's position, as opposed to relative to the top and/or bottom of the screen.

In another example embodiment, the size of the keyboard as a whole or even individual keys may be modified based on the detected touches. Specifically, when pressing on a touchscreen, the touchpoint is usually not merely a single point, but rather a contiguous area. While the size of this contiguous area can vary based on the pressure applied to each finger, it can also vary based on the size of the finger itself. In such cases, the keys themselves can be increased or decreased in size based on the detected size of the finger(s).

Figure 6:
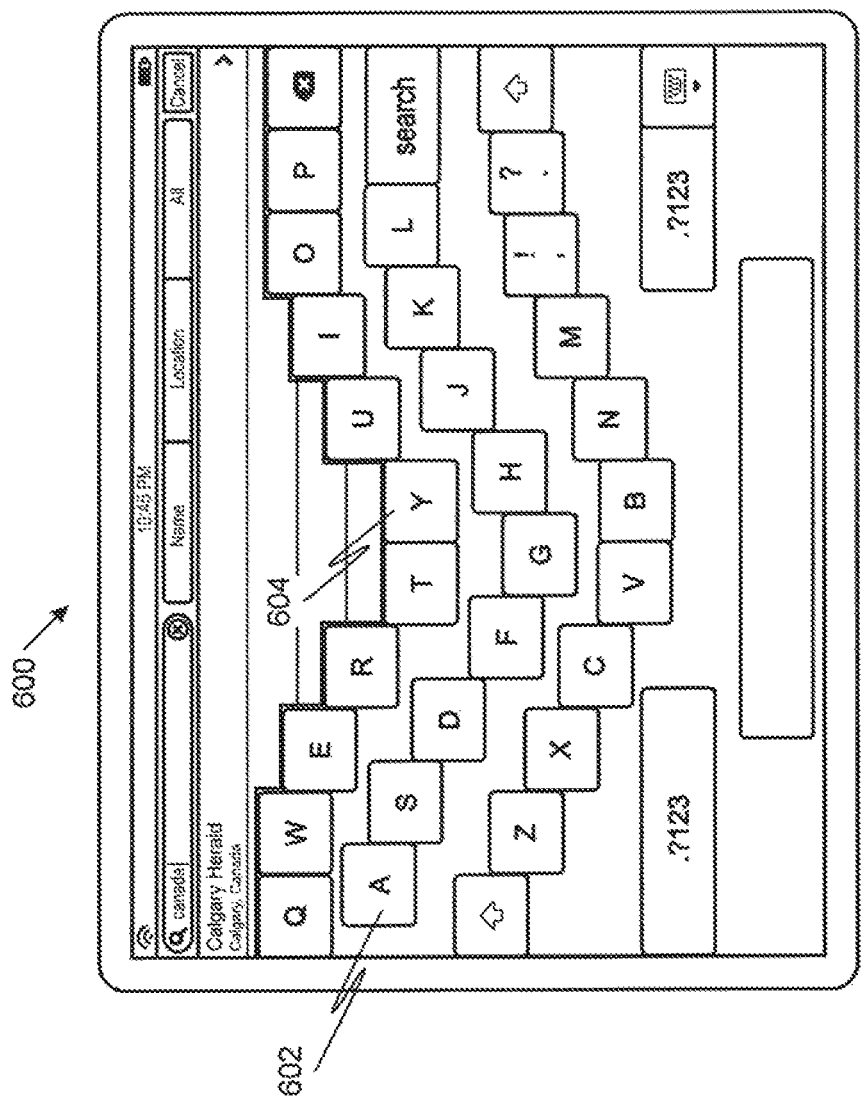
FIG. 6 is a diagram illustrating a mobile device, in accordance with an example embodiment, displaying a dynamically updated virtual keyboard with larger keys, made to accommodate a user with wider fingers.

FIG. 6 is a diagram illustrating a mobile device, in accordance with an example embodiment, displaying a dynamically updated virtual keyboard with larger keys, made to accommodate a user with wider fingers. As can be seen, on mobile device 600, a touchscreen 602 displays a keyboard 604 with larger keys. In some instances, rather than relying on (or, at least solely relying on) the size of the areas of depression to determine finger size, other factors may be used to estimate the user's finger size. For example, hand size was previously described as being detected, not only using palm detection but also based on finger locations. Such information can also be used to infer finger size, under the assumption, for example, that a larger hand means larger fingers. Other information, such as profile or usage history information may be used to enhance these inferences. For example, if the user profile indicates the user is a child, the fingers may be assumed to be smaller. Likewise, if usage history (e.g., sites frequently visited by the user) imply a child is using the device, the fingers may be assumed to be smaller.

Figure 7:
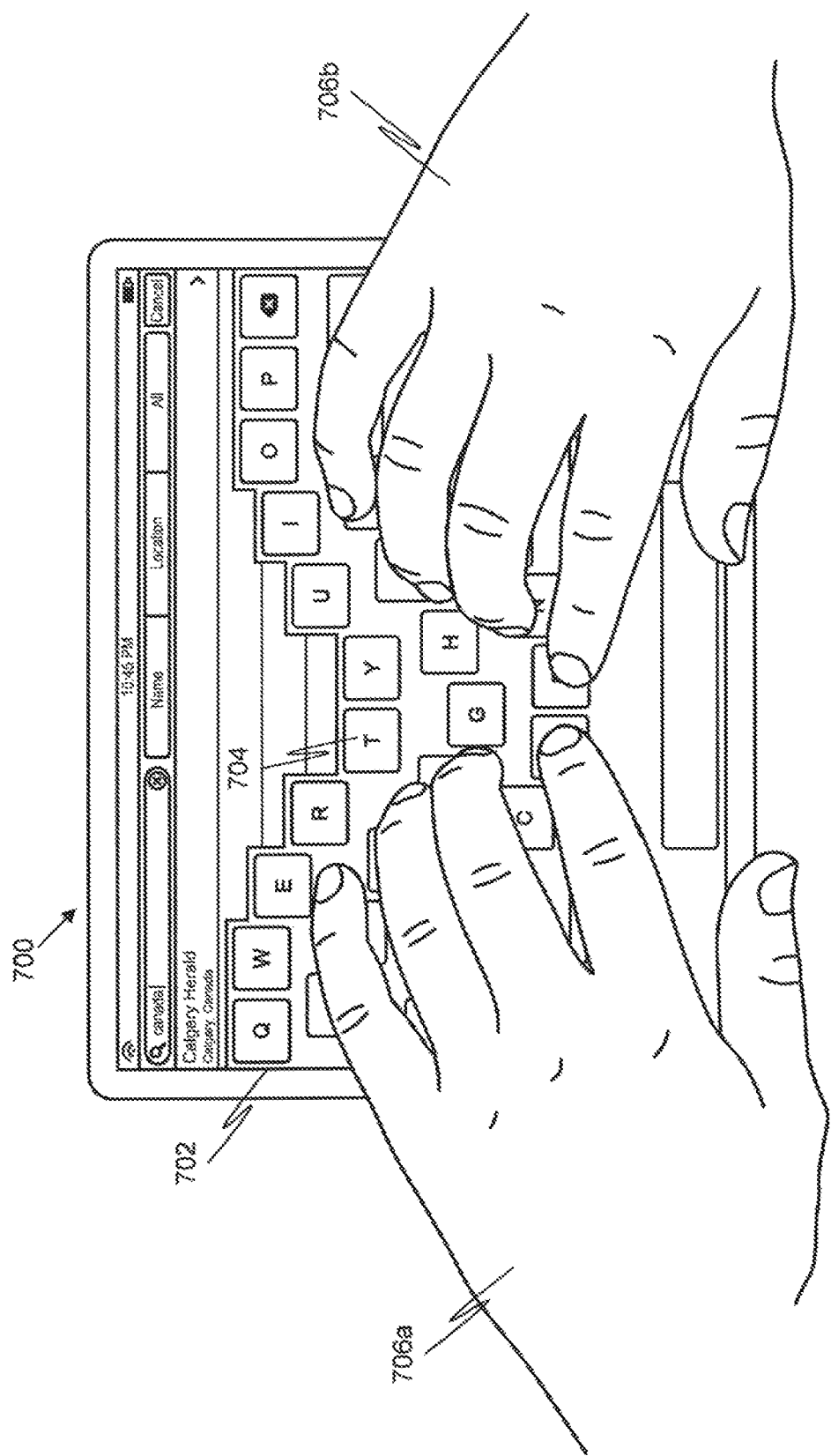
FIG. 7 is a diagram illustrating a mobile device where, in accordance with an example embodiment, the user has hands oriented substantially at angles.

In another example embodiment, the orientation of the user's hands may be used to dynamically modify the virtual keyboard. FIG. 7 is a diagram illustrating a mobile device where, in accordance with an example embodiment, the user has hands oriented substantially at angles. Specifically, the mobile device 700 includes a touchscreen 702 having a default keyboard 704, but the user's hands 706a, 706b are placed at nearly 45 degree angles to the bottom of the touchscreen 702.

Figure 8:
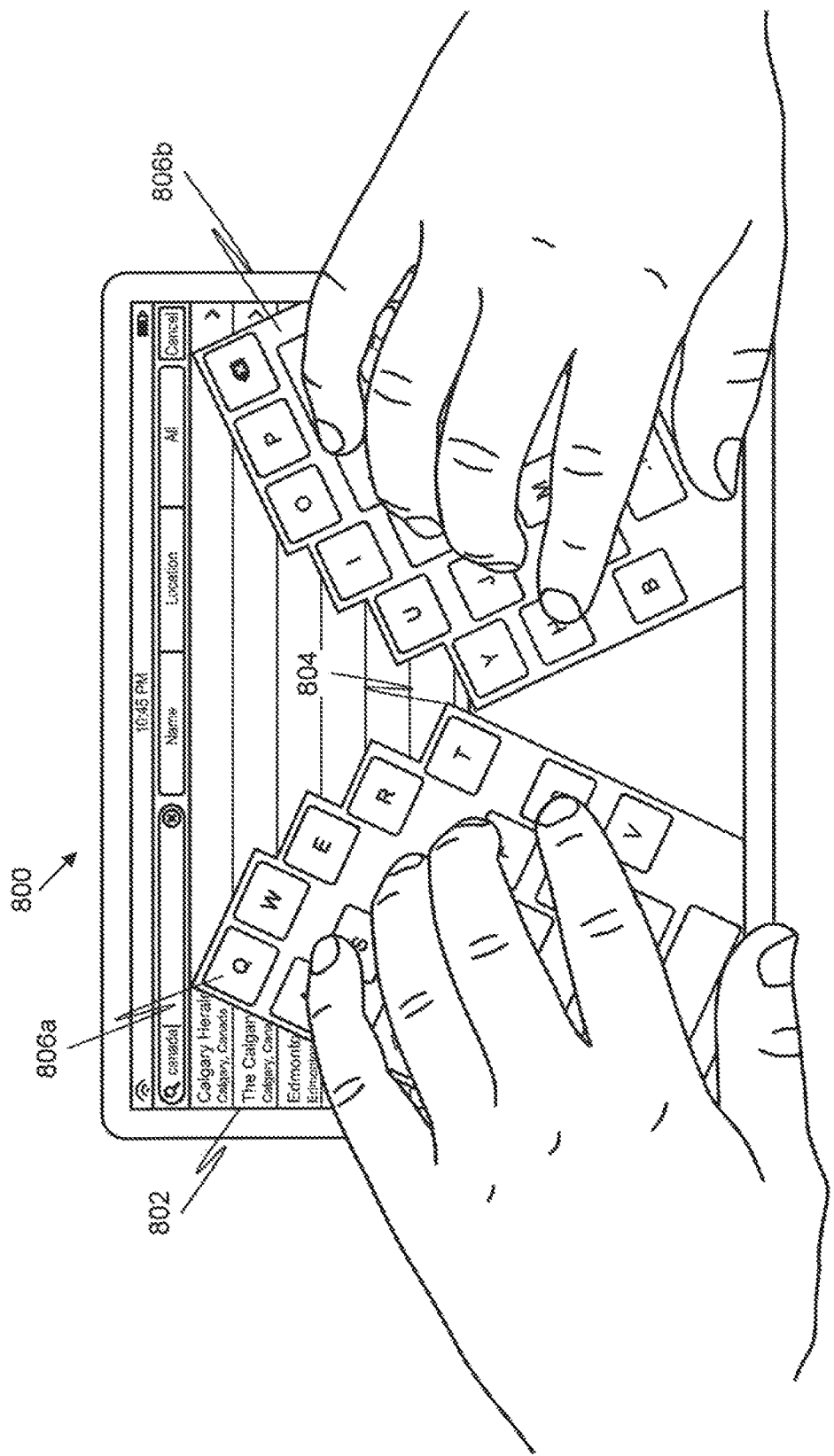
FIG. 8 is a diagram illustrating a mobile device, in accordance with an example embodiment, displaying a dynamically updated virtual keyboard with rotated keys.

In such an instance, the system may rotate certain keys to accommodate the new hand positions. FIG. 8 is a diagram illustrating a mobile device, in accordance with an example embodiment, displaying a dynamically updated virtual keyboard with rotated keys. Specifically, mobile device 800 includes a touchscreen 802 with a dynamically updated virtual keyboard 804, where one half of the keyboard 806a has been rotated nearly 45 degrees in one direction and the other half of the keyboard 806b has been rotated nearly 45 degrees in the other direction.

In another example embodiment, biometric information, such as fingerprint information or hand size and shape, can quickly identify a user to the system and the system can then extract and utilize a keyboard profile (including, for example, hand layout) previously saved for the user.

In another example embodiment, the touchscreen is not located on a mobile device or even a computing device, but rather on a separate peripheral. For example, rather than providing a typical physical keyboard for a computer, a touchscreen can be used to provide a virtual keyboard. This would allow the user's keyboard to be customized expressly for him or her, and for people who share a computer to have keyboards to their liking despite sharing the same input device. Currently, for example, a husband and wife who share a computer also typically share one physical keyboard. If one spouse uses a certain keyboard layout or hand orientation, or has hands with a different size or shape than the other, either a compromise should be made or one of the two spouse may suffer. A virtual keyboard would allow both spouses to enjoy the keyboard layout that best suits them. The same hand and finger detection techniques described above could also be applied to the case of a separate peripheral.

In the case of a smaller touchscreen, such as on most smartphones, it may not be easy or even possible for the user to have both hands on the touchscreen at the same time. In such instances, it may be beneficial to provide a more limited keyboard or keypad for the user to use. For example, a numeric keypad can be provided to allow the user to utilize the virtual keypad as a calculator. In another example, a limited number of letters may be provided. While full typing capabilities would obviously be limited in cases where less than all 26 letters of the English alphabet were provided, it still might be useful in cases where, for example, a user simply needs to enter a passcode and thus only limited letters are used.

Figure 9B:
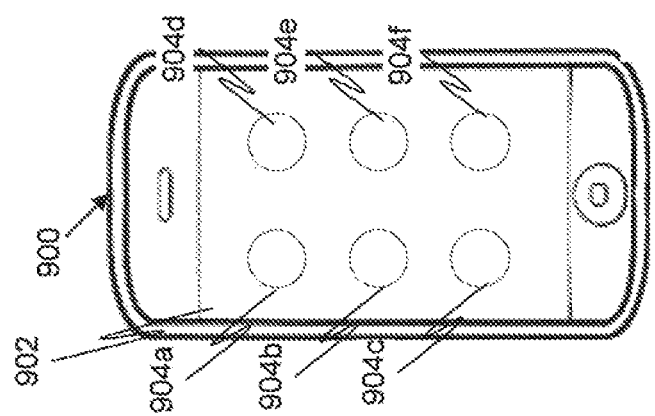
FIGS. 9A and 9B depict smaller mobile devices, in accordance with example embodiments, depicting different key combinations on a dynamically updated virtual keyboard.
Figure 9A:
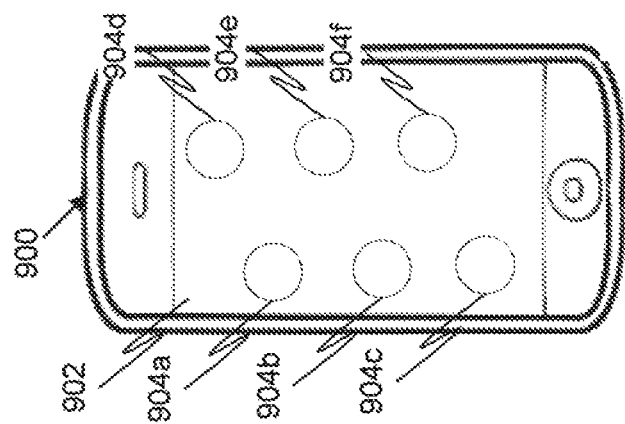

On a touchscreen which is quite small, such as 2 inches by 3 inches, there is still space enough for six different finger positions (either three positions for two fingers or two positions for three fingers). FIGS. 9A and 9B depict smaller mobile devices, in accordance with example embodiments, depicting different key combinations on a dynamically updated virtual keyboard. Referring first to FIG. 9A, mobile device 900 has a smaller touchscreen 902 than would easily accommodate two hands. In this case, the system determines that a full virtual keyboard is impractical. A more limited virtual keyboard, such as a number pad, is anticipated instead. However, the user's hand position makes even such a number pad difficult to accommodate. As such, rather than, for example, 10-keys typically displayed in a number pad, only six keys 904a-904f are displayed. Used in combination, these six positions can easily be combined to create a full 10-key keypad. For example, for two fingers with three positions each:

Finger 1 at 904a=1
Finger 1 at 904b=2
Finger 1 at 904c=3
Finger 2 at 904d=4
Finger 2 at 904e=5
Finger 2 at 904f=6
Fingers 1 and Finger 2 at 904a, 904d, respectively=7
Fingers 1 and Finger 2 at 904b, 904e, respectively=8
Fingers 1 and Finger 2 at 904c, 904f, respectively=9
Finger 1 at 904b and Finger 2 at 904f=0

FIG. 9A depicts a key layout designed for a user placing his or her hand on the touchscreen from the side of the device. FIG. 9B depicts a similar layout, except designed for a user placing his or her hand on the touchscreen from the bottom of the device. Here, the keys 904a-904f have been rotated and reoriented for a different hand position.

For visually impaired users, a common practice is to have buttons on the screen announce their value when tapped and register an input when double-tapped. These announcements are needed for discovery of the key locations, since visually impaired users will need a way to find out where the keys are on the device. However, sometimes these announcements are not desirable. For example, when entering a passcode on a lock screen, the user may not wish to have their passcode announced aloud as they type it. With a self-configuring virtual keyboard, the problem of discovery is solved. Since the keyboard or keypad automatically forms based on the position of the user's fingers, there is no need to announce the value of each key, since the keys will always be appropriately positioned under the user's fingers. This makes numeric/character entry easier and eliminates a privacy risk. Additionally, visually impaired users will not need to worry about the device's orientation, such as whether the device is right-side up or upside-down, since the virtual keyboard can form under their fingers regardless of orientation.

In another embodiment, the keyboard being formed need not merely be used on the device on which it is formed. Rather, the keyboard may be used to remotely control another device. For example, while the keyboard may be formed on a tablet computer or mobile phone, the keyboard may actually control a desktop computer or a television, via a Bluetooth connection (or other wireless standard).

Figure 10:
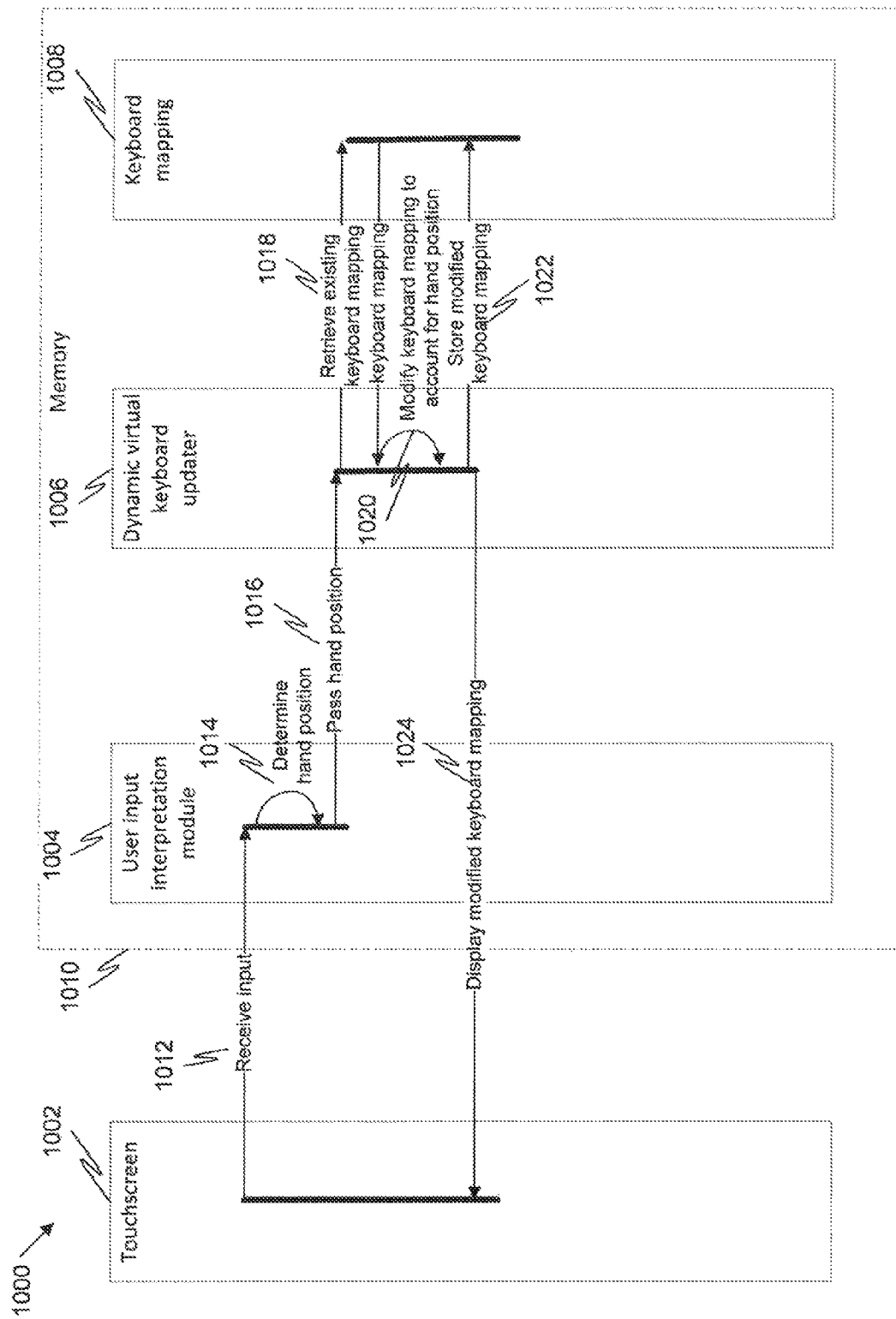
FIG. 10 is an interaction diagram illustrating a method, in accordance with an example embodiment, of dynamically updating a virtual keyboard.

FIG. 10 is an interaction diagram illustrating a method, in accordance with an example embodiment, of dynamically updating a virtual keyboard. The method 1000 may be operated by several components, including a touchscreen 1002, user input interpretation module 1004, a dynamic virtual keyboard updater 1006, and a keyboard mapping 1008. The user input interpretation module 1004, dynamic virtual keyboard updater 1006, and keyboard mapping 1008 may be contained in a memory 1010. In one example embodiment, all of these components are located on a single device such as a mobile device, although as explained earlier, in some embodiments one or more of the components may be located on other device (e.g., remote peripherals, servers).

At operation 1012, input is received from the touchscreen 1002. At operation 1014, the user input interpretation module 1004 then determines hand position based on the received input. At operation 1016, this hand position is passed to a dynamic virtual keyboard updater 1006. At operation 1018, an existing keyboard mapping 1008 is retrieved. At operation 1020, the dynamic virtual keyboard updater 1006 modifies the keyboard mapping 1008 to account for hand position. At operation 1022 the modified keyboard mapping 1008 may be stored, and at operation 1024 may be displayed on the touchscreen 1002.

Figure 11:
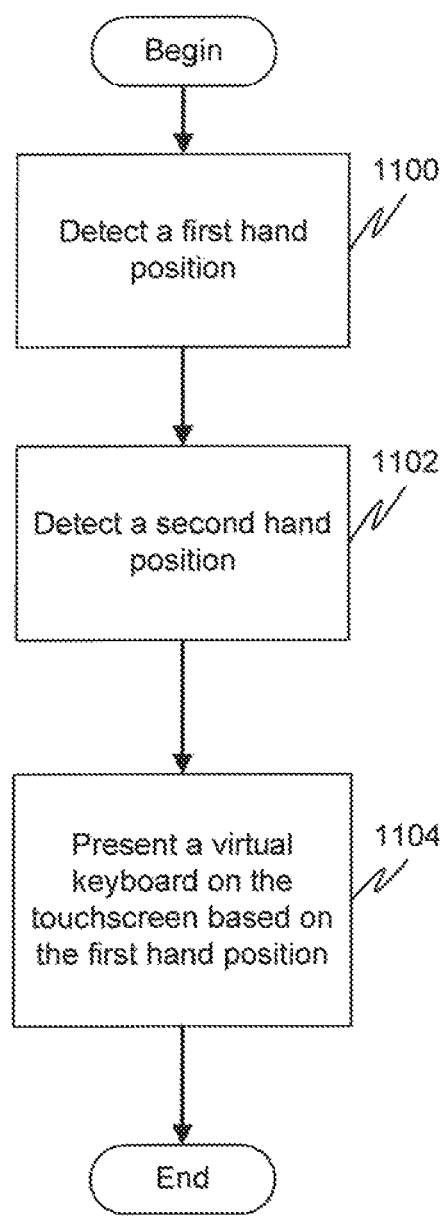
FIG. 11 is a flow diagram illustrating a method, in accordance with an example embodiment, of dynamically updating a virtual keyboard.

FIG. 11 is a flow diagram illustrating a method, in accordance with an example embodiment, of dynamically updating a virtual keyboard. At operation 1100, a first hand position on a touchscreen of an electronic device is detected. At operation 1102, a second hand position on a touchscreen of an electronic device is detected. At operation 1104, a virtual keyboard is presented on the touchscreen based on the first hand position.

Figure 12:
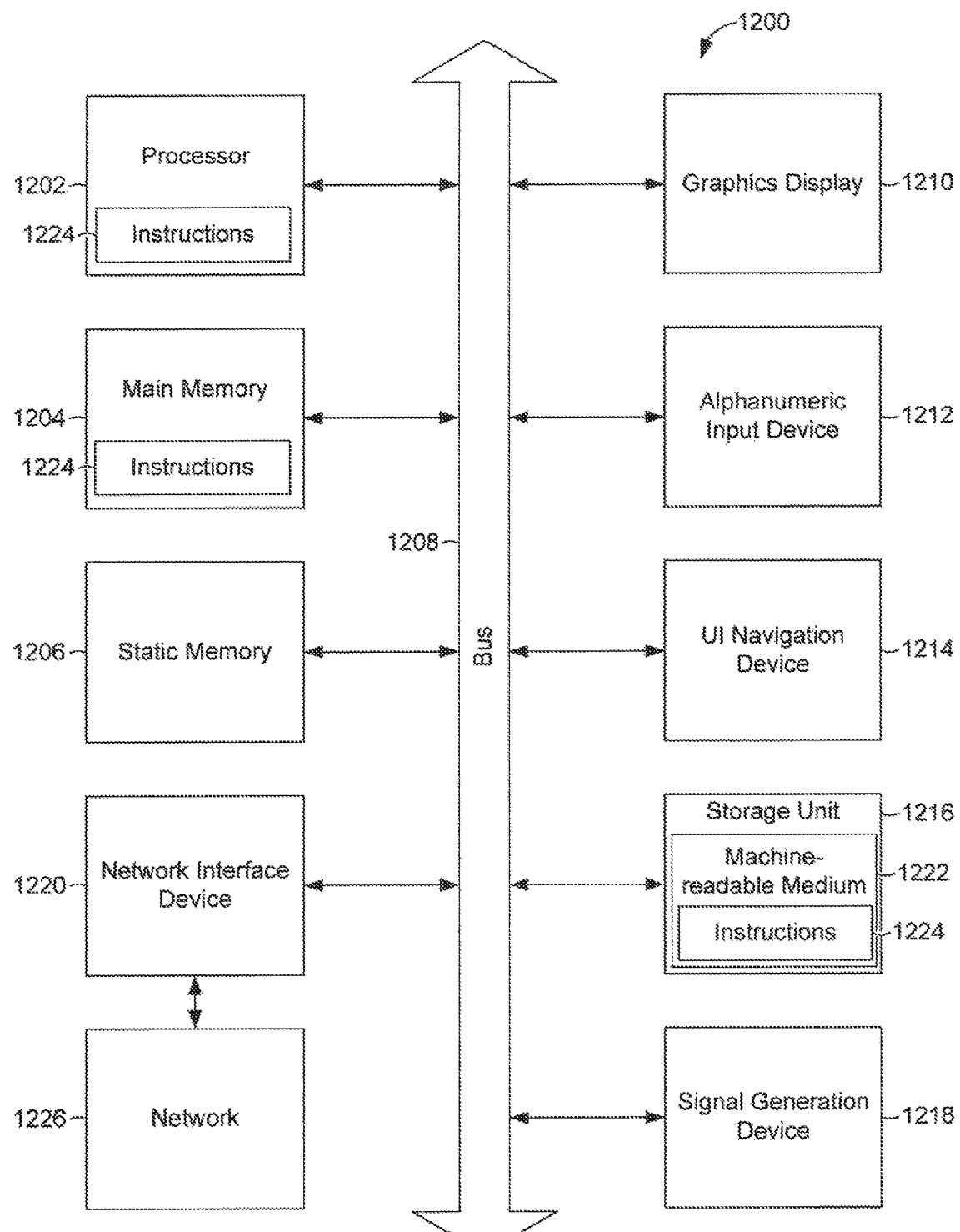
FIG. 12 is a block diagram of a computer processing system at a server system, within which a set of instructions for causing the computer to perform any one or more of the methodologies discussed herein may be executed.

FIG. 12 is a block diagram of a computer processing system at a server system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions perform any one or more of the methodologies discussed herein.

The example computer processing system 1200 includes processor 1202 (e.g., a central processing unit (CPU), a graphics processing unit (GPU) or both), main memory 1204 and static memory 1206, which communicate with each other via bus 1208. The processing system 1200 may further include graphics display 1210 (e.g., a plasma display, a liquid crystal display (LCD) or a cathode ray tube (CRT)). The processing system 1200 also includes alphanumeric input device 1212 (e.g., a keyboard), a user interface (UI) navigation device 1214 (e.g., a mouse, touch screen, or the like), a storage unit 126, a signal generation device 1218 (e.g., a speaker), and a network interlace device 1220.

The storage unit 1216 includes machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the processing system 1200, with the main memory 1204 and the processor 1202 also constituting computer-readable, tangible media. The instructions 1224 may further be transmitted or received over network 1226 via a network interface device 1220 utilizing any one of a number well-known transfer protocol (e.g., HTTP).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions 1224. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer-readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:
1. A method comprising:
    detecting a first hand position on a touchscreen of an electronic device;
    detecting a second hand position on the touchscreen;
    detecting ten fingers on the touchscreen;
    associating two fingers being furthest apart on the touchscreen with one pinkie of each of two different hands;

associating two fingers being next furthest apart on the touchscreen one ring finger of each of two different hands;
associating two fingers being next furthest apart on the touchscreen with one middle finger of each of two different hands;
associating two fingers being next furthest apart on the touchscreen with one index finger of each of two different hands;
associating two fingers being next furthest apart on the touchscreen with one thumb of each of two different hands;
deriving a line equation in form y=mx+b between the two pinkies, with y being a y-coordinate of the touchscreen and x being an x-coordinate of the touchscreen;
calculating a y-value corresponding to and using the line equation for an x-value of one of the thumbs;
when the y-value of the one of the thumbs is greater than the calculated y-value, associating a pinkie having a lowest x-value with a left hand; and
presenting a virtual keyboard on the touchscreen based on the first hand position, the second hand position, and the associations between fingers on the touchscreen and pinkies, ring fingers, middle fingers, index fingers, and thumbs.

2. The method of claim 1, further comprising detecting a size of a first hand and wherein a size of the virtual keyboard varies depending on the size of the first hand.

3. The method of claim 1, further comprising rotating at least a portion of the virtual keyboard based on the first hand position.

4. The method of claim 1, wherein the detecting includes detecting a plurality of fingers on the touchscreen and wherein the virtual keyboard is adjusted so that specific keys fall underneath particular fingers.

5. The method of claim 4, wherein the adjusting of the virtual keyboard so that specific keys fall underneath particular fingers include placing a home row of the keyboard along a line connecting the plurality of fingers.

6. The method of claim 1, wherein the virtual keyboard includes fewer keys than a corresponding physical keyboard, with keys on the corresponding physical keyboard missing from the virtual keyboard represented through gestures made by a user on keys present on the virtual keyboard.

7. The method of claim 4, further comprising:
detecting a home row of the virtual keyboard;
presenting the virtual keyboard so that the home row is oriented beneath the detected plurality of fingers.

8. The method of claim 1, further comprising:
extrapolating finger position based on the detected first hand position.

9. The method of claim 1, further comprising:
detecting typographical errors by a user and adjusting the virtual keyboard to reduce the typographical errors.

10. The method of claim 9, wherein the typographical errors are detected by tracking keys commonly pressed before pressing a backspace button.

11. The method of claim 1, further comprising discarding any touches when any of the following are true:
a distance from one hand's ring finger to that hand's middle finger is greater than a preset number of times that hand's distance from the pinkie to ring finger;
a distance from one hand's middle to index finger is greater than a preset number of times that hand's distance from the pinkie to ring finger; or
a distance from one hand's index finger to thumb is less than a preset number of times that hand's distance from the pinkie to ring finger.

12. A method comprising:
presenting a virtual keyboard to a client device for display on a touchscreen of the client device;
receiving, from the client device, a detected first hand position and a detected second hand position of a user on the touchscreen of the client device;
receiving, from the client device, a detected ten fingers on the touchscreen on the client device;
associating two fingers being furthest apart on the touchscreen with one pinkie of each of two different hands;
associating two fingers being next furthest apart on the touchscreen with one ring finger of each of two different hands;
associating two fingers being next furthest apart on the touchscreen with one middle finger of each of two different hands;
associating two fingers being next furthest apart on the touchscreen with one index finger of each of two different hands;
associating two fingers being next furthest apart on the touchscreen with one thumb of each of two different hands;
deriving a line equation in form y=mx+b between the two pinkies, with y being a y-coordinate of the touchscreen and x being an x-coordinate of the touchscreen;
calculating a y-value corresponding to and using the line equation for an x-value of one of the thumbs;
when the y-value of the one of the thumbs is greater than the calculated y-value, associating a pinkie having a lowest x-value with a left hand;
dynamically updating the virtual keyboard based on the detected first hand position of the user, the detected second hand position of the user, and the associations between fingers on the touchscreen and pinkies, ring fingers, middle fingers, index fingers, and thumbs; and
presenting the updated virtual keyboard to the client device for display on the touchscreen of the client device.

13. The method of claim 12, wherein the method is performed at a server.

14. A client device comprising:
a touchscreen;
a user input interpretation module comprising one or more processors and configured to detect a first hand position on the touchscreen, detect a second hand position on the touchscreen, and detect ten fingers on the touchscreen; and
a dynamic virtual keyboard updater configured to associate two fingers being furthest apart on the touchscreen with pinkie of each of two different hands, associate two fingers being next furthest apart on the touchscreen with one ring finger of each of two different hands, associate two fingers being next furthest apart on the touchscreen with one middle finger of each of two different hands, associate two fingers being next furthest apart on the touchscreen with one index finger of each of two different hands, associate two fingers being next furthest apart on the touchscreen with one thumb of each of two different hands, derive a line equation in form y=mx+b between the two pinkies, with y being a y-coordinate of the touchscreen and x being an x-coordinate of the touchscreen, calculate a y-value corresponding to and using the line equation for an x-value of one of the thumbs, when the y-value of the one of the thumbs is greater than the calculated y-value, associate a pinkie having a lowest x-value with a left hand, and present a virtual keyboard on the touchscreen based on the first hand position, the second hand position, and the associations between fingers on the touchscreen and pinkies, ring fingers, middle fingers, index fingers, and thumbs.

15. The client device of claim 14, wherein the client device is a mobile device.

16. The client device of claim 15, wherein the touchscreen is not large enough to accommodate a virtual keyboard placed where two hands of a user rest on the touchscreen.

17. A server comprising:
a processor;
a memory; and
a dynamic virtual keyboard updater configured to:
  present a virtual keyboard to a client device for display on a touchscreen of the client device;
  receive, from the client device, a detected first hand position of a user on the touchscreen of the client device;
  receive, from the client device, a detected second hand position of a user on the touchscreen of the client device;
  receive, from the client device, a detected ten fingers on the touchscreen on the client device;
  associate two fingers being furthest apart on the touchscreen with one pinkie of each of two different hands;
  associate two fingers being next furthest apart on the touchscreen with one ring finger of each of two different hands;
  associate two fingers being next furthest apart on the touchscreen with one middle finger of each of two different hands;
  associate two fingers being next furthest apart on the touchscreen with one index finger of each of two different hands;
  associate two fingers being next furthest apart on the touchscreen with one thumb of each of two different hands;
  deriving a line equation in form $y=mx+b$ between the two pinkies, with y being a y-coordinate of the touchscreen and x being an x-coordinate of the touchscreen;
  calculating a y-value corresponding to and using the line equation for an x-value of one of the thumbs;
  when the y-value of the one of the thumbs is greater than the calculated y-value, associating a pinkie having a lowest x-value with a left hand;
  dynamically update the virtual keyboard based on the detected first hand position of the user, the detected second hand position of the user, and the associations between fingers on the touchscreen and pinkies, ring fingers, middle fingers, index fingers, and thumbs; present the updated virtual keyboard to the client device for display on the touchscreen of the client device.

18. The server of claim 17, wherein the server is a web server.

19. A non-transitory computer-readable storage medium comprising instructions that, when executed by at least one processor of a machine, cause the machine to perform operations comprising:
  detecting a first hand position on a touchscreen of an electronic device;
  detecting a second hand position on the touchscreen;
  detecting ten fingers on the touchscreen;
  associating two fingers being furthest apart on the touchscreen with one pinkie of each of two different hands;
  associating two fingers being next furthest apart on the touchscreen one ring finger of each of two different hands;
  associating two fingers being next furthest apart on the touchscreen with one middle finger of each of two different hands;
  associating two fingers being next furthest apart on the touchscreen with one index finger of each of two different hands;
  associating two fingers being next furthest apart on the touchscreen with one thumb of each of two different hands;
  deriving a line equation in form $y=mx+b$ between the two pinkies, with y being a y-coordinate of the touchscreen and x being an x-coordinate of the touchscreen;
  calculating a y-value corresponding to and using the line equation for an x-value of one of the thumbs;
  when the y-value of the one of the thumbs is greater than the calculated y-value, associating a pinkie having a lowest x-value with a left hand; and
  presenting a virtual keyboard on the touchscreen based on the first hand position, the second hand position, and the associations between fingers on the touchscreen and pinkies, ring fingers, middle fingers, index fingers, and thumbs.

* * * * *